United States Patent
Provost et al.

(10) Patent No.: US 10,814,929 B2
(45) Date of Patent: *Oct. 27, 2020

(54) MOUNTING BAR, MOUNTING BRACKET, AND KIT FOR USE WITH A BICYCLE

(71) Applicant: Kent International Inc., Parsippany, NJ (US)

(72) Inventors: Michael Anthony Provost, Lincoln, RI (US); Ronald Peter Barbagallo, Newton, NJ (US)

(73) Assignee: Kent International Inc., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,628

(22) Filed: Mar. 13, 2019

(65) Prior Publication Data

US 2019/0210687 A1 Jul. 11, 2019

Related U.S. Application Data

(63) Continuation of application No. 15/348,050, filed on Nov. 10, 2016, now Pat. No. 10,266,224.

(60) Provisional application No. 62/253,423, filed on Nov. 10, 2015.

(51) Int. Cl.
| | | |
|---|---|---|
| *B62K 19/00* | (2006.01) | |
| *B62K 19/40* | (2006.01) | |
| *B62K 3/04* | (2006.01) | |
| *B62J 1/28* | (2006.01) | |
| *B62J 11/00* | (2020.01) | |
| *B62J 1/16* | (2006.01) | |

(52) U.S. Cl.
CPC ............... *B62K 19/40* (2013.01); *B62J 1/167* (2013.01); *B62J 1/28* (2013.01); *B62J 11/00* (2013.01); *B62K 3/04* (2013.01); *B62J 1/16* (2013.01)

(58) Field of Classification Search
CPC .... B62K 19/40; B62K 3/04; B62J 1/28; B62J 1/16
USPC .......................................................... 224/421
See application file for complete search history.

(56) References Cited

U.S. PATENT DOCUMENTS

| | | |
|---|---|---|
| 453,212 A | 6/1891 | Sager |
| 460,031 A | 9/1891 | Rastetter et al. |
| 3,515,431 A | 6/1970 | Grady |
| 3,738,704 A | 6/1973 | Smith et al. |
| 3,902,737 A | 9/1975 | Berger et al. |
| 4,305,532 A | 12/1981 | Reminger |
| 4,632,453 A | 12/1986 | Robbin et al. |
| D291,506 S | 8/1987 | Shields |

(Continued)

FOREIGN PATENT DOCUMENTS

| | | |
|---|---|---|
| DK | 12131 C | 5/1909 |
| GB | 2474667 A | 4/2011 |

OTHER PUBLICATIONS

European Patent Office, Extended European Search Report for European Application No. 16865017.4 dated Jun. 17, 2019, 16 pages.

(Continued)

*Primary Examiner* — Peter N Helvey
(74) *Attorney, Agent, or Firm* — Fitch, Even, Tabin & Flannery, LLP

(57) ABSTRACT

A mounting bar, bracket, and kit have been developed such that they can couple to a head tube of the bicycle when in a first configuration and then couple to a top tube of a bicycle when in a second configuration. The bracket may be integral with the mounting bar or may be a separate component.

16 Claims, 22 Drawing Sheets

(56) References Cited

U.S. PATENT DOCUMENTS

| | | | |
|---|---|---|---|
| 4,809,890 | A | 3/1989 | Tsigadas |
| 4,919,479 | A | 4/1990 | Loewke et al. |
| 4,964,551 | A | 10/1990 | O'Donovan et al. |
| 4,969,658 | A | 11/1990 | Levarek et al. |
| 4,970,630 | A | 11/1990 | Mudrovich |
| 5,104,188 | A | 4/1992 | Jefferson |
| 5,149,112 | A | 9/1992 | Nauman et al. |
| 5,330,214 | A | 7/1994 | Bishaf et al. |
| 5,467,906 | A | 11/1995 | Forman |
| 5,927,801 | A | 7/1999 | Miree |
| 6,264,223 | B1 | 7/2001 | Loewke et al. |
| 6,435,523 | B1 | 8/2002 | Hilk |
| 7,523,986 | B2 | 4/2009 | Jefferson et al. |
| 2002/0192015 | A1 | 12/2002 | Wang |
| 2005/0274758 | A1 | 12/2005 | Jefferson |

OTHER PUBLICATIONS

PCT International Search Report and Written Opinion of the International Searching Authority dated Jan. 13, 2017 for International Application No. PCT/US2016/061366 (36 pages).

MOUNTING BAR, MOUNTING BRACKET, AND KIT FOR USE WITH A BICYCLE

CROSS-REFERENCE TO RELATED APPLICATIONS

This application is a continuation of prior application Ser. No. 15/348,050, filed Nov. 10, 2016, which claims benefit of U.S. Provisional Application No. 62/253,423, filed Nov. 10, 2015.

FIELD

The present application generally relates to a mounting bar, mounting bracket, and kit for a bicycle and, more particularly to a mounting bar, mounting bracket, and kit suitable for various forms of attachment to a bicycle.

BACKGROUND

Mounting systems have been used with bicycles for affixing various structures thereto. For example, mounting systems have been developed whereby a child seat can be mounted to a bicycle. Such mounts have oftentimes been positioned behind the rider, adjacent the rear wheel. However, positioning a child behind the rider can create a number of problems and difficulties, such as difficulty dismounting from the bicycle, difficulty observing the child when riding, and positioning the weight of the child over the rear wheel potentially creating instability.

In another form, the child seat may be mounted in front of the rider, such as adjacent the head tube of the bicycle. This form may help to minimize some of the concerns with rear mounted child seats. In this form, a mounting bar is typically coupled to the seat post and the head tube of the bicycle.

However, such an installation can be difficult as different bicycles have different dimensions, such as between the head tube and the seat post. In this regard, the mounting bar may need to be configured with different lengths and at different angles due to the relative heights of the support structures on the bicycle. Further, the positioning of the top tube of the bicycle may also interfere with positioning a mounting bar.

SUMMARY

In view of the above issues, a new mounting bar, bracket, and kit have been developed. The mounting bar, bracket, and kit may be designed such that they can couple to a head tube of the bicycle when in a first configuration and then couple to a top tube of a bicycle when in a second configuration. This may increase the number of mounting options available and may also be suitable for accommodating various sized bicycles.

According to one form, a kit is provided for mounting accessories to a bicycle. The kit includes a mounting bar and a mounting bracket. The mounting bar includes a first end, a second end, and a body positioned between the first and second ends. The first end includes a front end portion and a bottom portion. The second end is configured for coupling to a seat post of the bicycle. The mounting bracket has a front portion and a body portion. The front portion has a front surface that is at least one of generally arcuate, generally V-shaped, and a combination thereof. The body portion has a lower surface that is at least one of generally arcuate, generally V-shaped, and a combination thereof. The mounting bracket is configured to couple the first end of the mounting bar, wherein the front portion of the mounting bracket is positioned adjacent the front end portion and the body portion of the mounting bracket is positioned adjacent the bottom portion.

According to one form, the mounting bracket is removably secured within the first end of the mounting bar.

In one form, the front portion of the mounting bracket is configured to contact a head tube portion of the bicycle in a first configuration and the body portion of the mounting bracket is configured to contact a top tube portion of the bicycle in at least one of the first configuration and a second configuration wherein the front portion of the mounting bracket does not contact the head tube portion of the bicycle.

In accordance with one form, the kit further includes a front coupling bracket and a top coupling bracket, wherein the front coupling bracket is configured to couple to the front portion of the mounting bracket in the first configuration and the top coupling bracket in the second configuration.

According to one form, the mounting bar comprises at least two body portions wherein a first body portion is configured to be slidably received in a second body portion to adjust a distance between the first and second ends.

In one form, the body has a longitudinal axis and a width extending perpendicular to the longitudinal axis, the first end having a width larger than the width of the body.

A mounting bracket is also provided. The mounting bracket has a front portion and a body portion. The front portion has a front surface that is at least one of generally arcuate, generally V-shaped, and a combination thereof. The body portion has a lower surface that is at least one of generally arcuate, generally V-shaped, and a combination thereof. The body portion is generally integral with the front portion. The front surface is configured to at least partially couple to a head tube of the bicycle when installed in a first configuration and the bottom surface is configured to at least partially couple to a top tube of the bicycle when installed in at least one of the first configuration and a second configuration. The front portion of the mounting bracket does not contact the head tube portion of the bicycle.

According to one form, the bracket is made from at least one of polymers, metal, carbon fiber, and combinations thereof.

In one form, the bracket further includes at least two flanges extending from the front portion.

In accordance with one form, the body portion includes a substantially planar top surface extending along a longitudinal plane and substantially planar side portions extending substantially perpendicular to the longitudinal plane.

According to one form, the front surface is inclined at an angle of about 65 to about 90 degrees relative to the top surface. In another form, the angle is about 75 to about 85 degrees.

According to one form, a mounting bracket is provided for use in mounting accessories to a bicycle. The mounting bracket includes a front portion and a body portion. The front portion has a generally arcuate or generally V-shaped front surface. The body portion has a generally arcuate or generally V-shaped bottom surface with the body portion being generally integral with the front portion. The generally arcuate or generally V-shaped front surface is configured to at least partially couple to a head tube of the bicycle when installed in a first configuration and the generally arcuate or generally V-shaped bottom surface is configured to at least partially couple to a top tube of the bicycle when installed in a second configuration.

In one form, a mounting bar is provided for mounting accessories to a bicycle. The mounting bar includes a first end, a second end, and a body extending between the first and second ends. The first end has a generally arcuate or generally V-shaped front portion and a generally arcuate or generally V-shaped bottom portion. The second end is configured to couple to a seat post of the bicycle. The generally arcuate or generally V-shaped front portion is configured to contact at least a portion of a head tube of the bicycle when in a first configuration and the generally arcuate or generally V-shaped bottom portion is configured to contact at least a portion of a top tube of the bicycle when in a second configuration.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
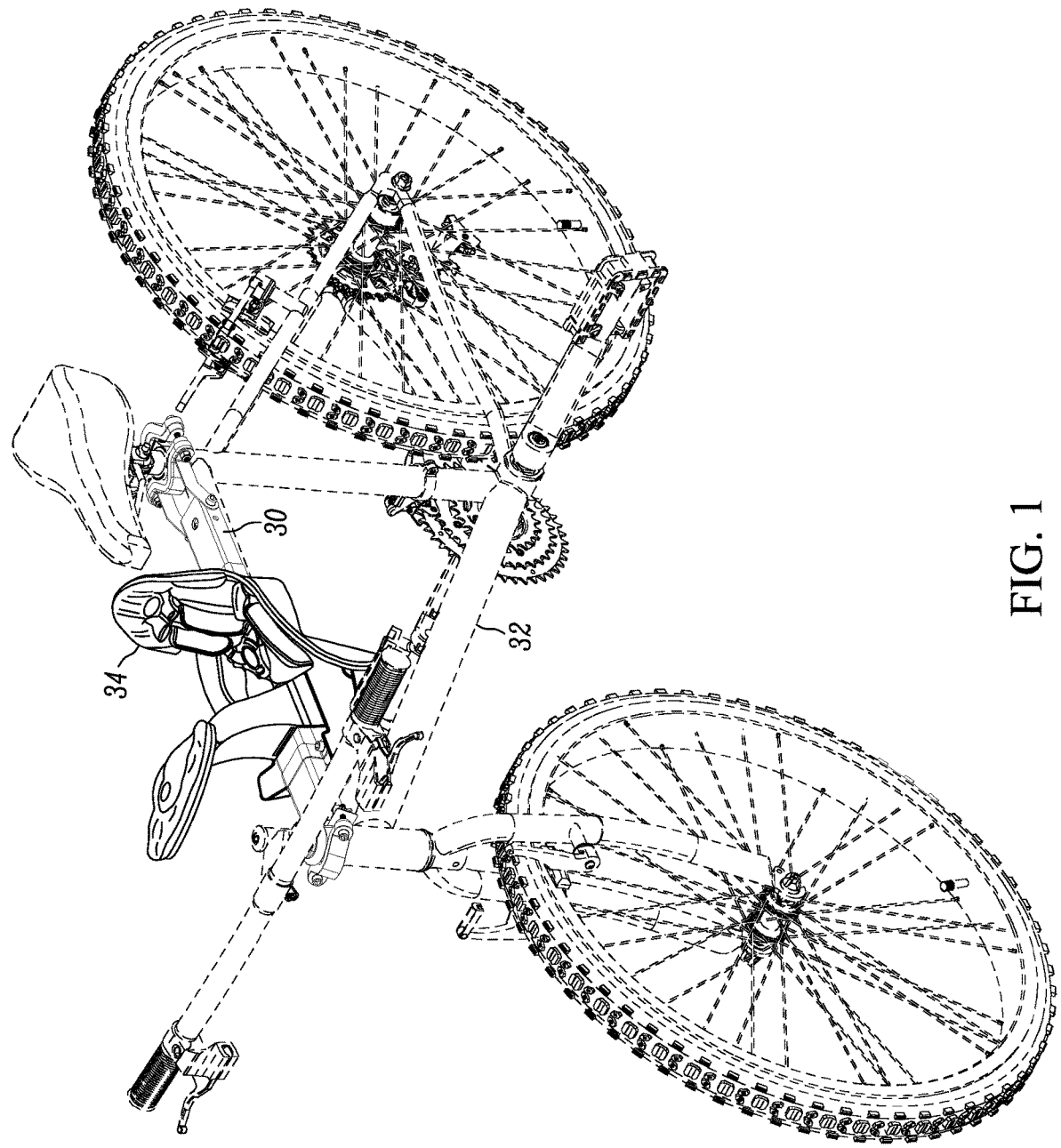
FIG. 1 is a perspective view of a mounting bar installed on a bicycle with a child seat attached.

Referring to the figures, various forms of mounting bars, brackets, kits, and associated components are illustrated. Referring to FIG. 1, a mounting bar 30 is shown attached to a bicycle 32 along with a child seat 34 attached to the bicycle 32. It should be appreciated that the mounting bar 32 can be used to attach a variety of different styles of child seat, as well as a variety of different devices, such as baskets, seats, and the like, to the bicycle.

Figure 2:
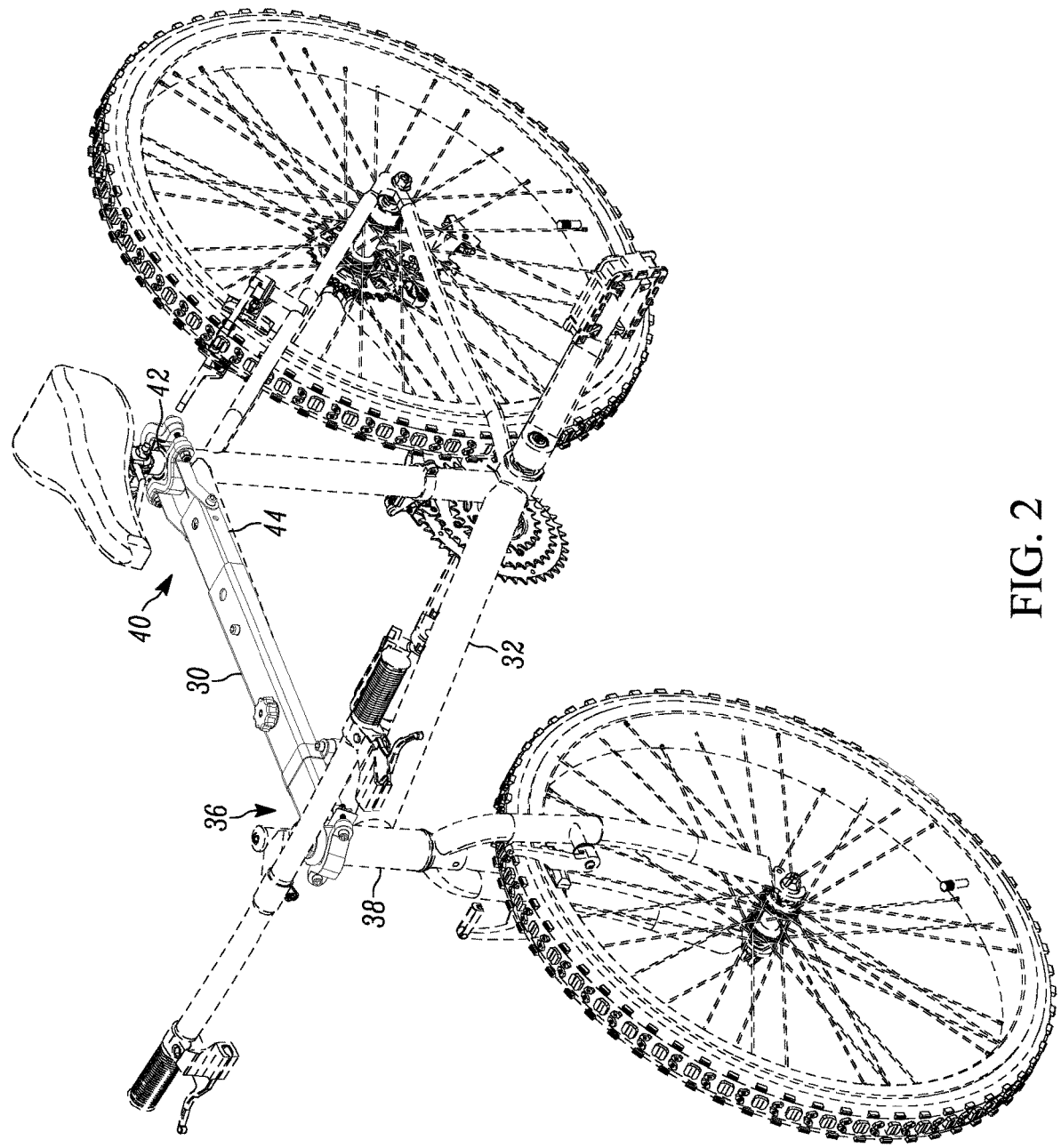
FIG. 2 is a perspective view of the mounting bar of FIG. 1 with the child seat removed.

As seen in FIG. 2, the mounting bar 30 includes a first end 36 configured to be coupled to a head tube 38 in a first configuration, and a second end 40 configured to be coupled to a seat tube 42. It should be appreciated that the first end 36 can also be configured to couple to a top tube 44, in a second configuration, in addition to or in the alternative to the head tube 38.

Figure 12:
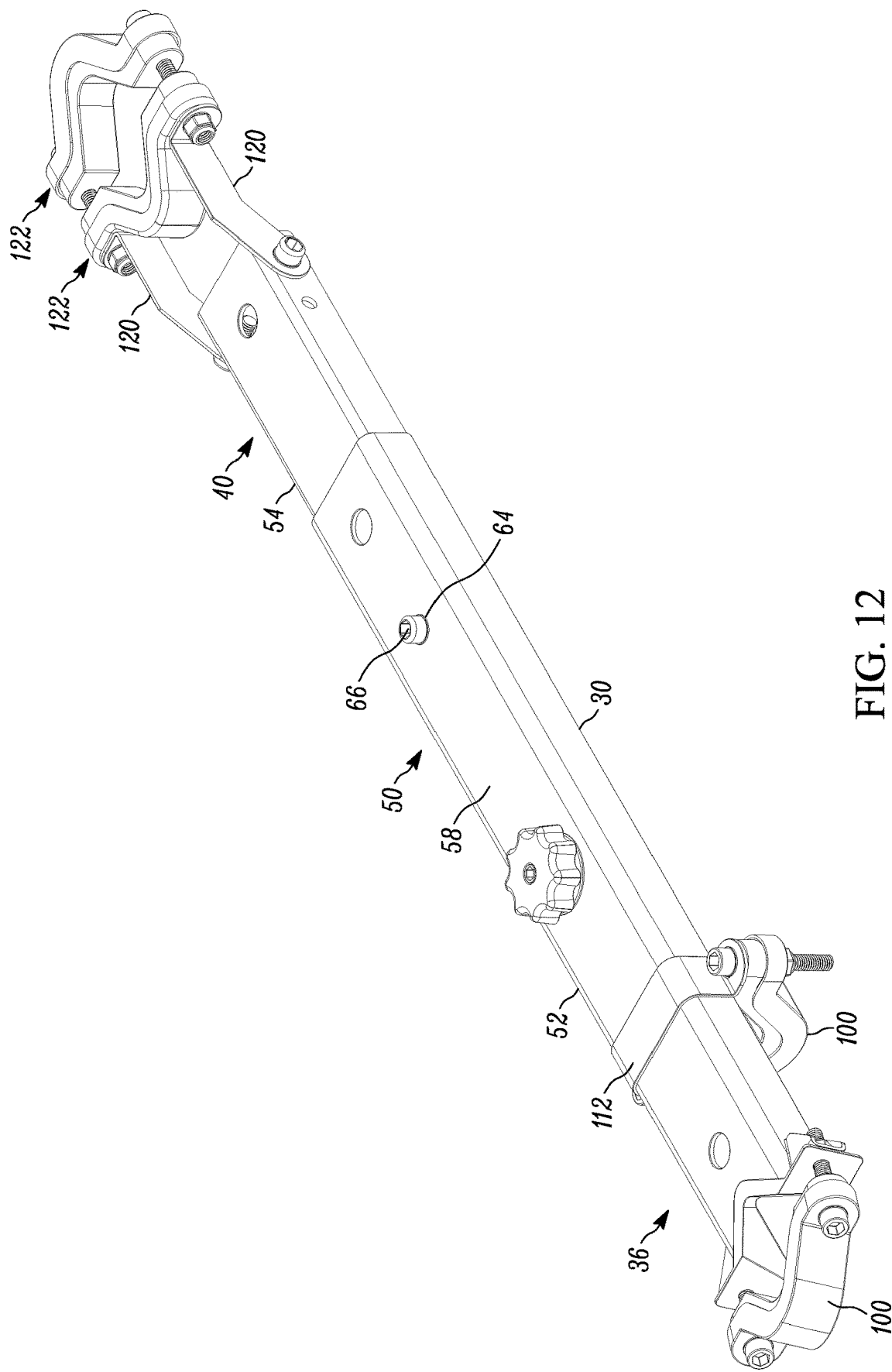
FIG. 12 is a perspective view of one form of a mounting bar in an assembled form.

Referring to FIG. 12, the mounting bar 30 includes a body portion 50 positioned between the first end 36 and the second end 40. The body portion 50 can take a variety of configurations. As shown in FIG. 12, the body portion 50 includes at least two body portions, a first portion 52 and a second portion 54. By having multiple portions, the body portion 50 can be configured to extend a variety of different lengths. In this regard, different sized and shaped bicycles can be used with the mounting bar 30. Further, the mounting bar 30 may take a variety of shapes and lengths. In one form, as shown in FIG. 12, the mounting bar 30 is in the form of an open rectangle having three sides. It should be appreciated that other shapes and sizes are also contemplated. The body portion 50 may also be a single piece or may be made up of more than two portions.

Figure 13:
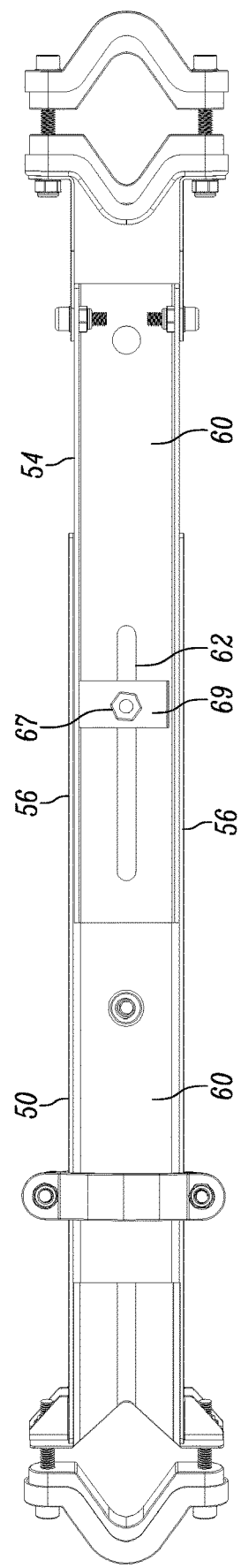
FIG. 13 is a bottom view of the mounting bar of FIG. 12.
Figure 14:
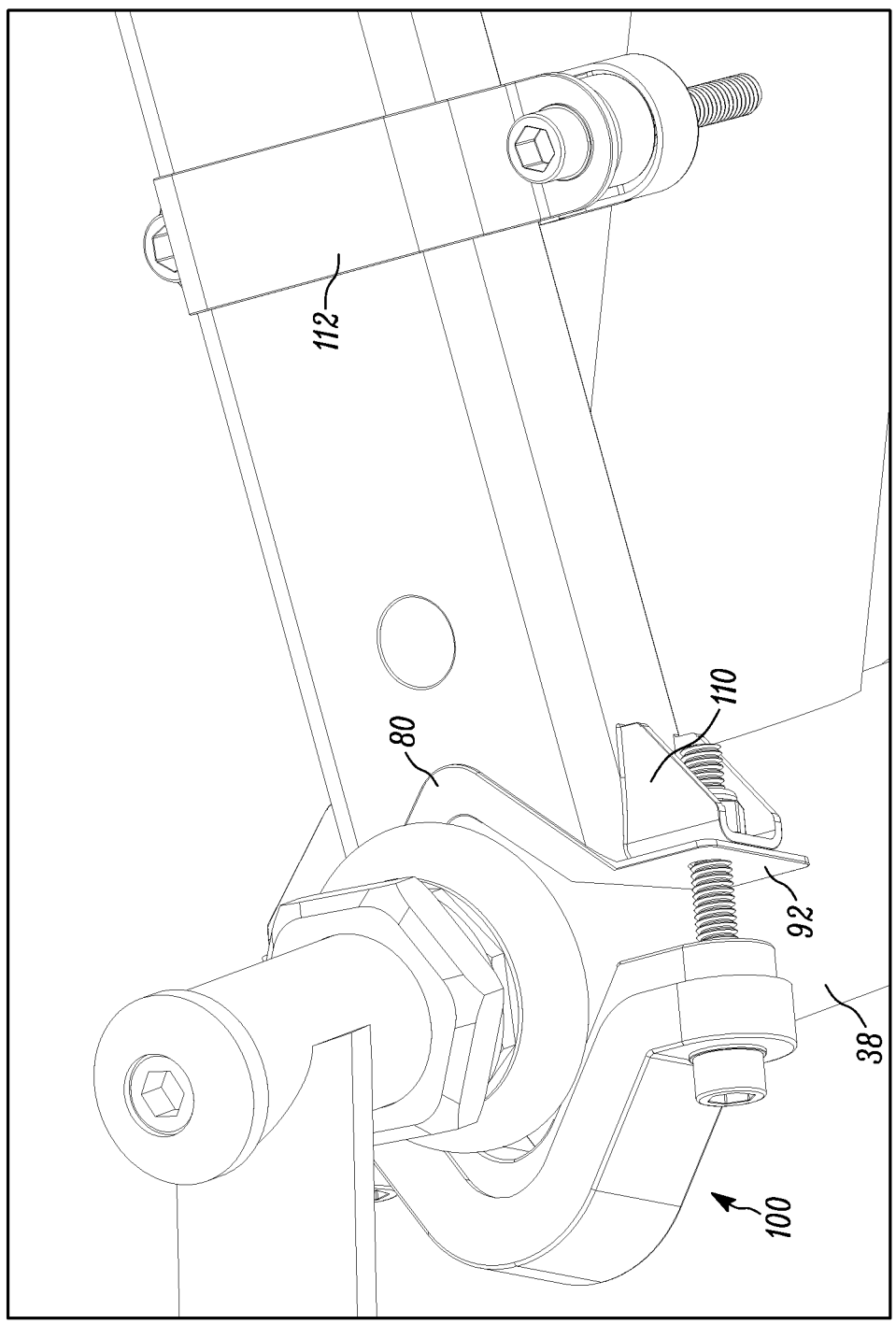
FIG. 14 is a partial view of a first end of a mounting bar attached to a head tube of a bicycle.

As seen in FIG. 13, in one form, the second portion 54 is configured to insert into the first portion 52. It should be appreciated that the reverse configuration is also contemplated along with other methods to couple the first and second portions 52,54. The body portion 50 may also include generally flat side walls 56 and a top wall 58, having a bottom portion 60. In this regard, a top wall 58 of the second portion 54 may contact a bottom 60 of the first body portion 52. The body portions 52,54 may also be sized so that they are slidable relative to one another. Further, the body portions 52,54 may also include one or more flanges (not shown) to only permit sliding engagement and/or limit travel of the body portions.

The body portion 50 may also include a slot 62, such as shown in FIG. 13. The slot 62 may be configured to permit adjustment in the length of the body portion 50. For example, the first body portion 52 may include an opening 64 that permits a fastener 66 to extend therethrough and cooperate with the slot 62 in the second body portion 54 to permit adjustment in the overall length of the body portion 50. A nut or other fastener 67 can be used alone or in combination with a flange 69.

Figure 3:
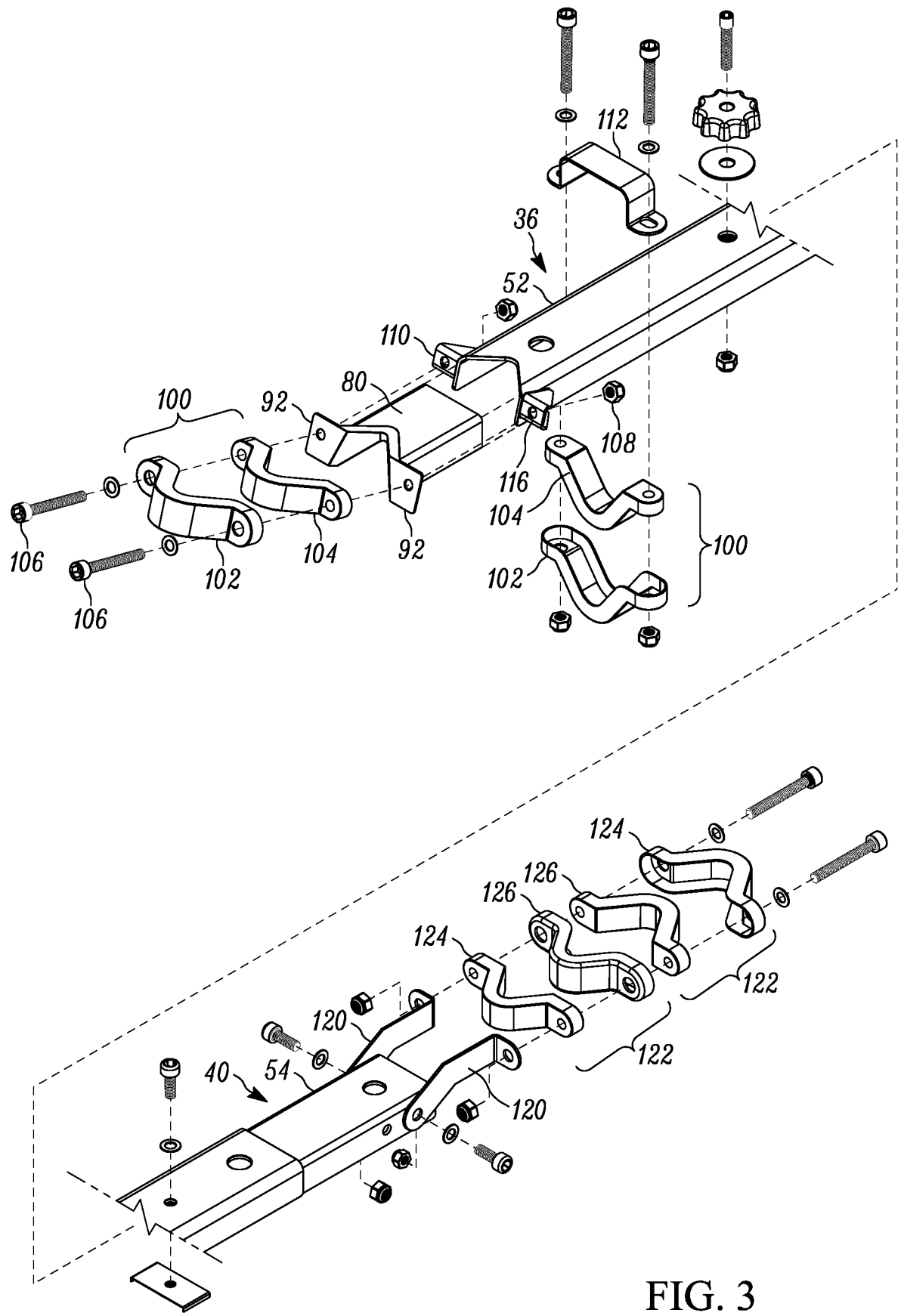
FIG. 3 is an exploded view of one form of a mounting bar.
Figure 4:
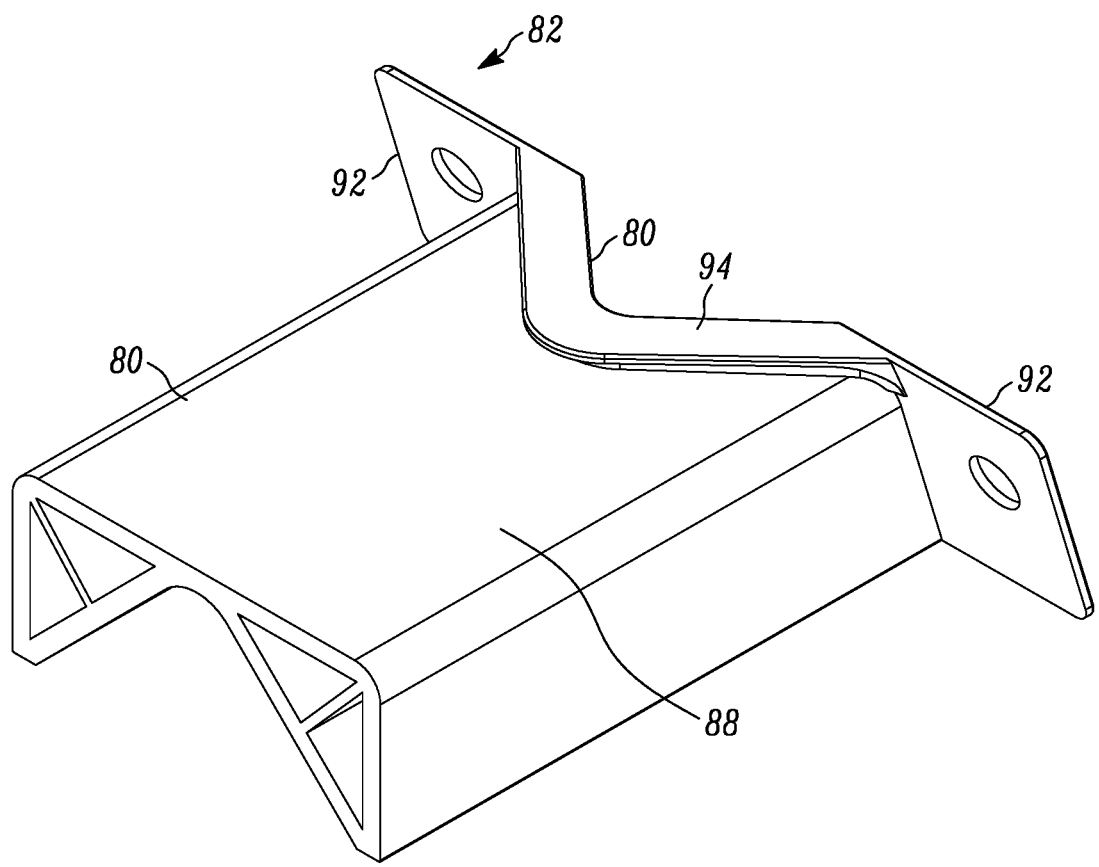
FIG. 4 is a rear perspective view of a mounting bracket.
Figure 5:
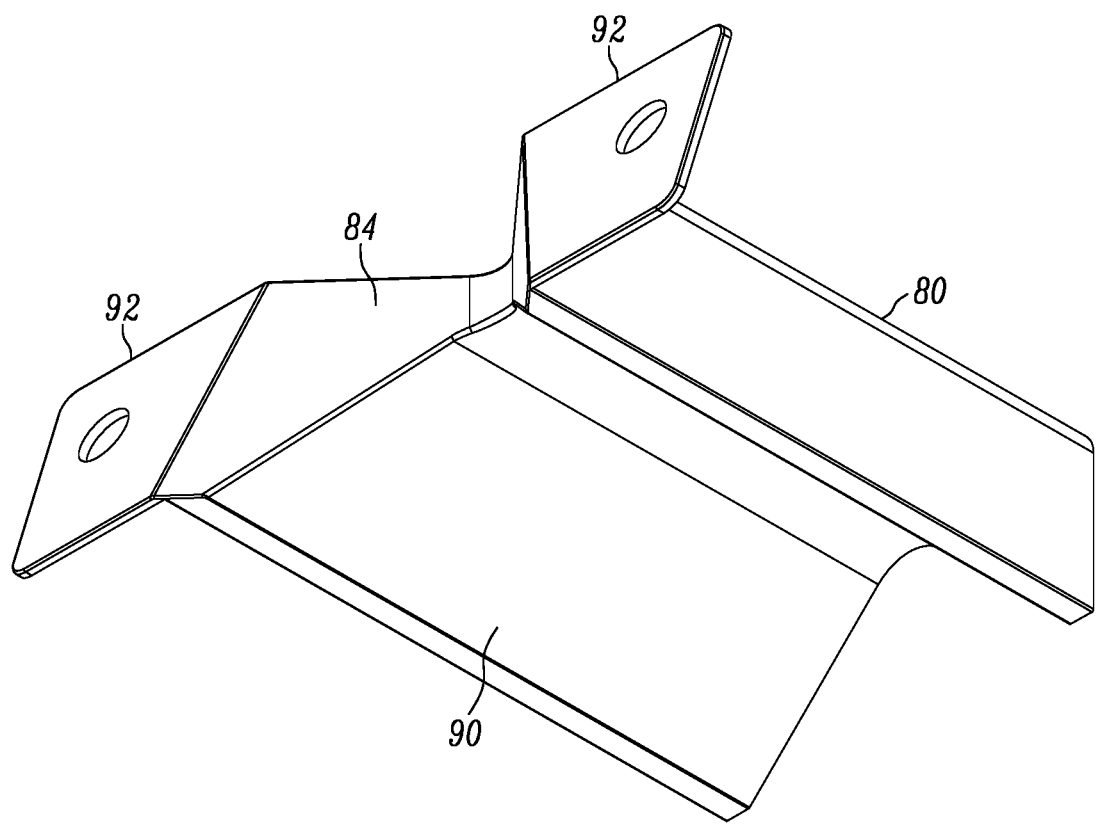
FIG. 5 is a bottom, front perspective view of the mounting bracket of FIG. 4.
Figure 6:
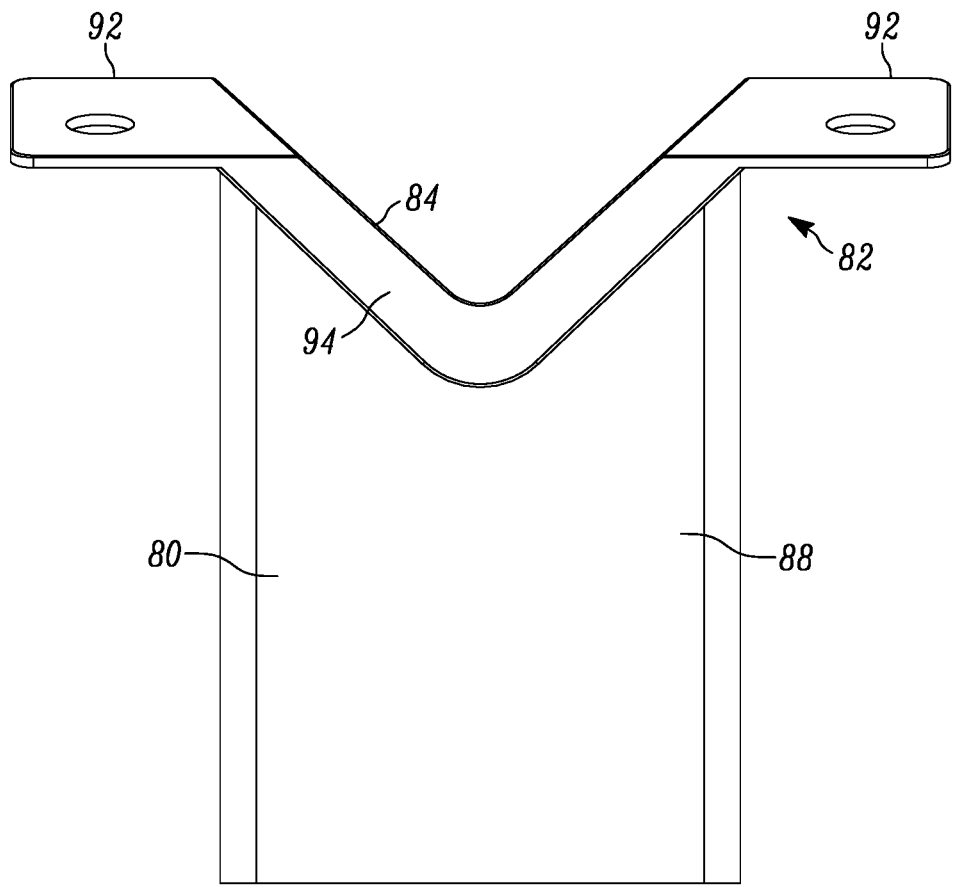
FIG. 6 is a top view of the mounting bracket of FIG. 4.
Figure 7:
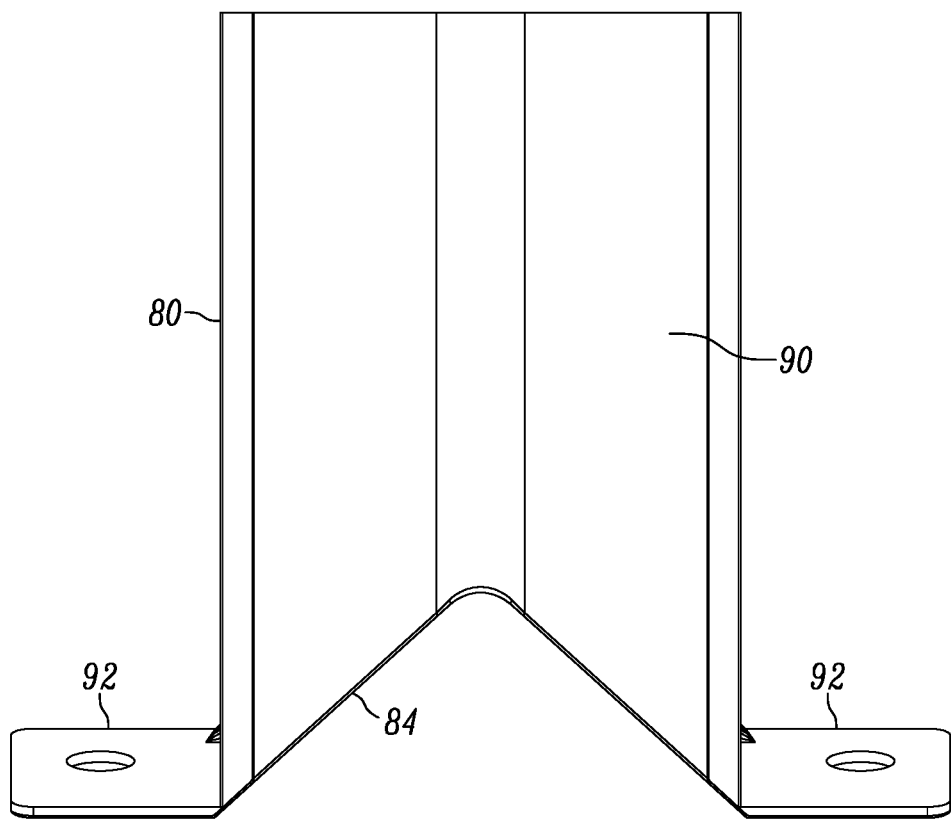
FIG. 7 is a bottom view of the mounting bracket of FIG. 4.

The first end 36 may also include a mounting bracket 80. As shown in FIG. 3, the mounting bracket 80 may be removable from the first end 36 such that it may be considered as a mounting bar insert. In an alternative form, the mounting bracket 80 may be integral with the first end 36.

As seen in FIGS. 4-11, the mounting bracket 80 includes a front portion 82 having a front surface 84 and a body portion 86 having an upper surface 88 and a lower surface 90. The front surface 84 may take a variety of different shapes and sizes so as to accommodate a head tube of a bicycle. Typically the head tube is generally cylindrical, but may come in a variety of different shapes or sizes. Therefore, the front surface 84 may be at least one of generally arcuate, generally V-shaped, and a combination thereof. In these forms, the front surface 84 can accommodate different sizes, shapes, and diameters of head tubes. Further, the front portion 82 may be integral with the body portion 86 or the two portions may be separable from one another.

Figure 8:
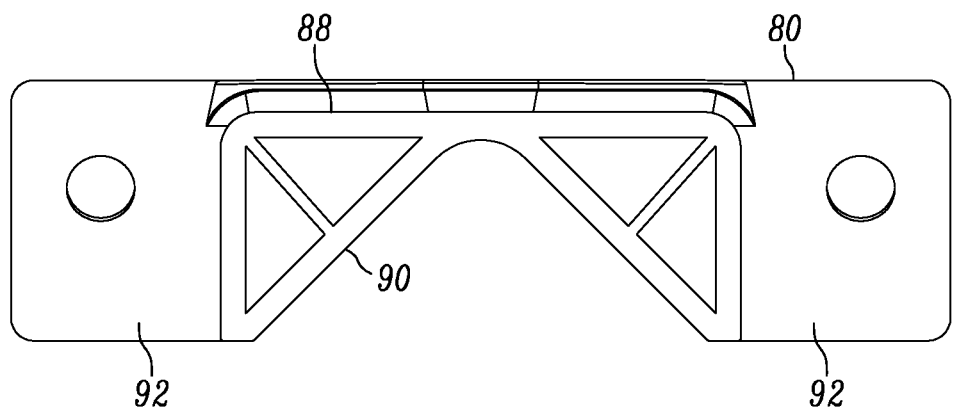
FIG. 8 is a rear view of the mounting bracket of FIG. 4.
Figure 9:
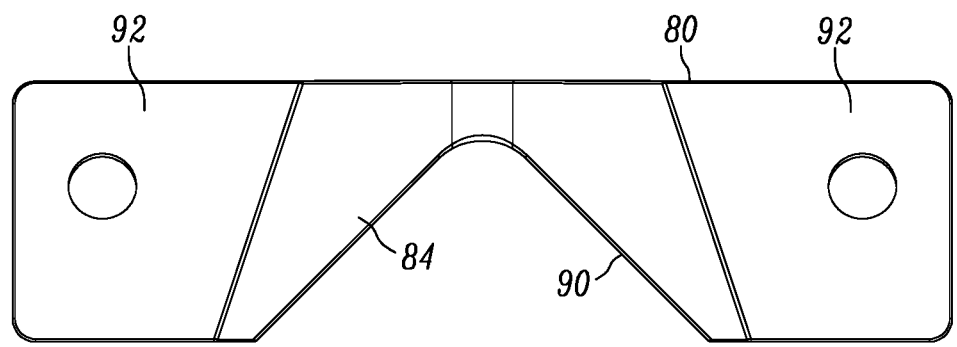
FIG. 9 is a front view of the mounting bracket of FIG. 4.
Figure 10:
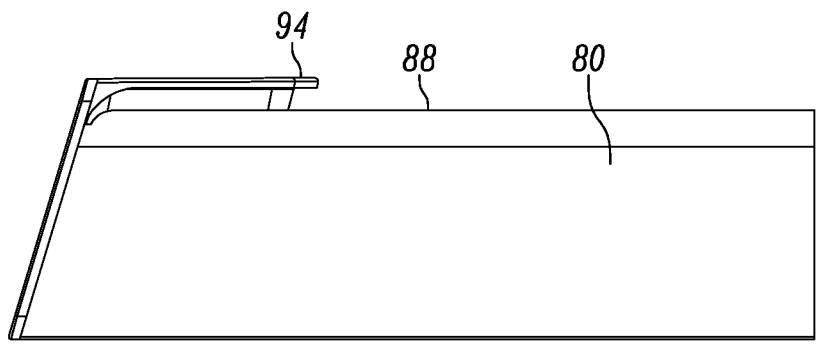
FIG. 10 is a left side view of the mounting bracket of FIG. 4.

The upper surface 88, in one form, is generally flat to cooperate with the bottom surface of the body portion 50. However, the upper surface 88 may take a variety of different shapes. The lower surface 90 may also take a variety of shapes. In one form, the lower surface 90 may be configured to cooperate with a top tube 44 of a bicycle. In this regard, the top tube 44 may take a variety of shapes, sizes, and diameters. To accommodate such differences, the lower surface 90 may be at least one of generally arcuate, generally V-shaped, and a combination thereof, when viewed in cross section, as seen in FIGS. 8 and 9.

The mounting bracket 80 may also include a variety of other structures, such as flanges, openings, and the like, to accommodate other structures and/or secure the mounting bracket 80 and mounting bar 30. For example, the mounting bracket 80 may include flanges 92 extending therefrom to help secure to a further bracket, as will be discussed in more detail below. Further, the mounting bracket 80 may also include an upper flange 94 to help position and secure the mounting bracket 80 in the mounting bar 30.

Figure 11:
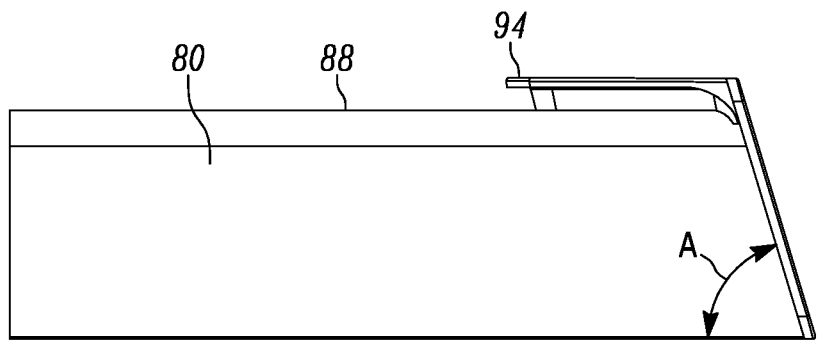
FIG. 11 is a right side view of the mounting bracket of FIG. 4.

Referring to FIG. 11, the front surface 84 may be inclined at an angle relative to the body portion 86 and/or a longitudinal axis of the mounting bar 30. For example, the angle, A may be about 65 to about 90 degrees relative to the top surface. In another form, the angle is about 75 to about 85 degrees. In this regard, by having the front surface at an angle other than 90 degrees, the mounting bar 30 may be more easily maintained at the desired angle relative to the head tube. This can be seen in FIGS. 2 and 15.

Additional structures may also be used to secure the mounting bracket 80 and/or the mounting bar 30 to the bicycle. Referring to FIG. 3, a front coupling bracket 100 is provided for cooperating with the first end 36 to secure the mounting bar 30 to the bicycle. In one form, the coupling bracket 100 may include multiple pieces, such as an outer bracket 102 and an inner bushing 104. A variety of fasteners may be used to secure the mounting bar 30, such as bolts 106 and nuts 108.

Figure 15:
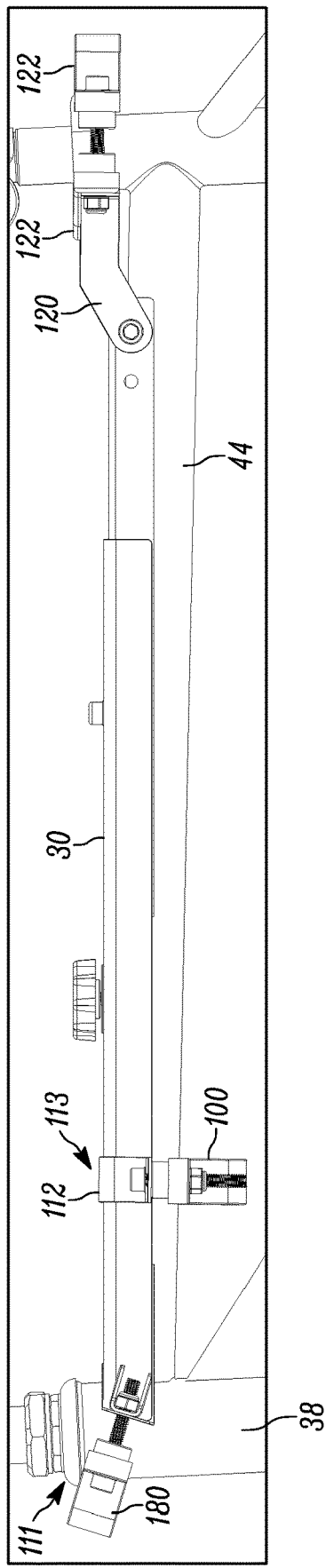
FIG. 15. Is a side view of a mounting bar showing locations where a first end of the mounting bar may be attached to a bicycle and a second end may be attached to a seat post.
Figure 16:
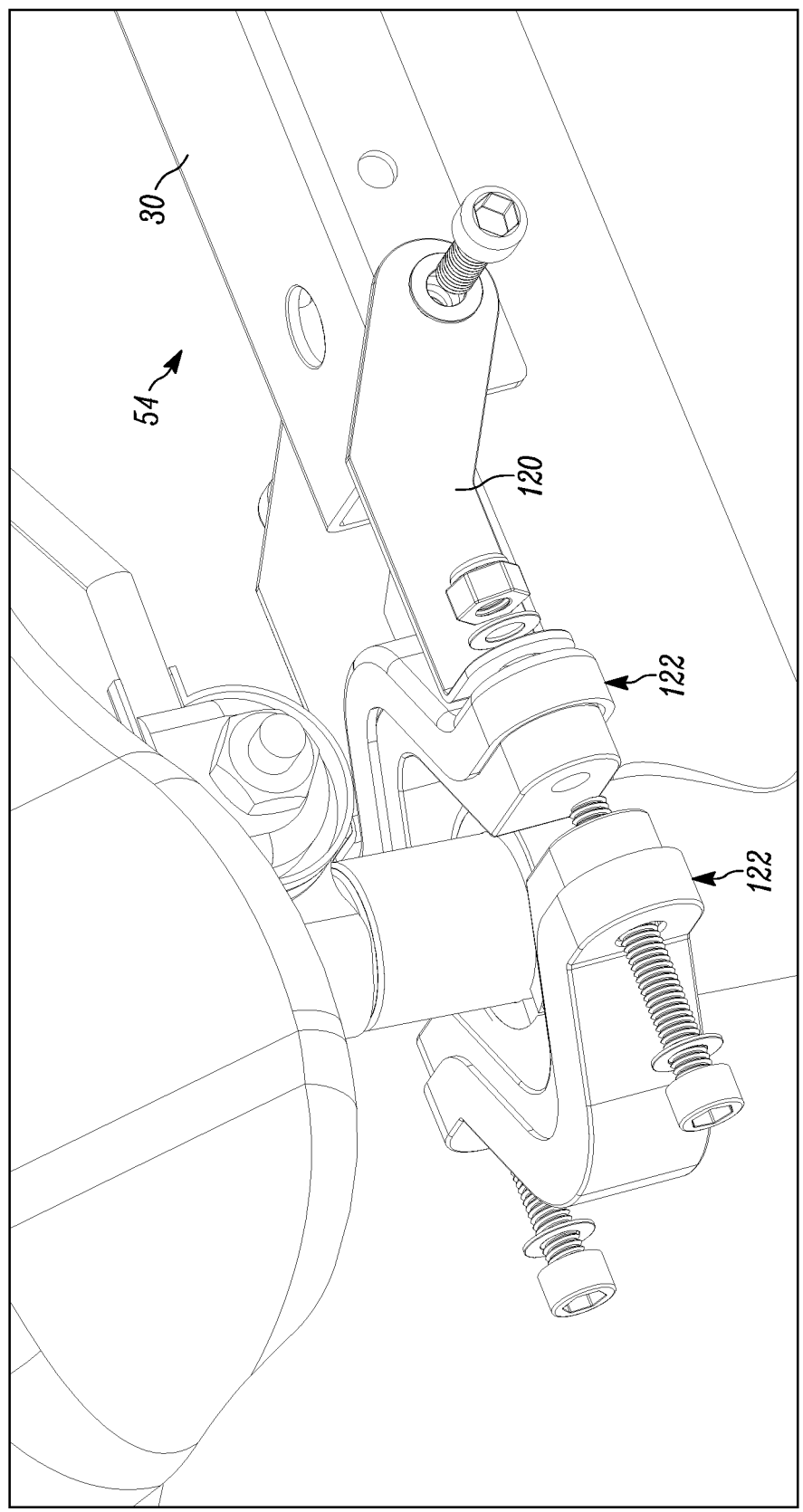
FIG. 16 is a partial view of a second end of a mounting bar attached to a seat post of a bicycle.

The front coupling bracket 100 may be used to couple the mounting bar 30 in a first configuration about a head tube of a bicycle, such as shown in FIG. 15 at arrow 111. In this form, the coupling bracket cooperates with the flanges 92 and/or flanges 110. The coupling bracket 100 may take a variety of shapes and forms. For example, the coupling bracket 100 may include one or more surfaces that are generally arcuate, generally V-shaped, or a combination thereof. In this form, the coupling bracket 100 may be used with elongated tube shapes, such as cylindrical tubes, oval tubes, and the like, as typically found on bicycles.

The front coupling bracket 100 may also be used to couple the mounting bar 30 to a top tube 44 of the bicycle, in a second configuration as shown in FIG. 15 at arrow 113. In the second configuration, the front coupling bracket 100 may cooperate with a top coupling bracket 112. It should be appreciated that a single front coupling bracket 100 may be used such that the first and second configurations are exclusive of one another. In another form, multiple front coupling brackets 100 may be used such that both the first and second configurations may be used in combination whereby the mounting bar 30 is secured to both the head tube 58 and the top tube 44. However, certain configurations of bicycles may make it easier to couple to only the head tube, such as when there is no top tube, or only the top tube, such as when the position or orientation of the head tube is undesirable for mounting. In this regard, a single front coupling bracket 100 is used and may be interchangeable between the configurations.

The second end 40 may also include a variety of structures for securing the mounting bar 30 to the bicycle. In one form, the second end 40 may include one or more linkages 120 extending therefrom. Further, a plurality of coupling brackets may be used to secure to a seat post 42 of a bicycle. For example, a plurality of coupling brackets 122 may be used. In one form, coupling brackets may include an outer portion 124 and an inner portion 126. The coupling brackets 122 may be similar to front coupling bracket 100. Further, coupling brackets 122 may take a variety of shapes and forms. For example, the coupling brackets 122 may include one or more surfaces that are generally arcuate, generally V-shaped, or a combination thereof. In this form, the coupling brackets 122 may be used with elongated tube shapes, such as cylindrical tubes, oval tubes, and the like, as typically found on bicycles.

Figure 17:
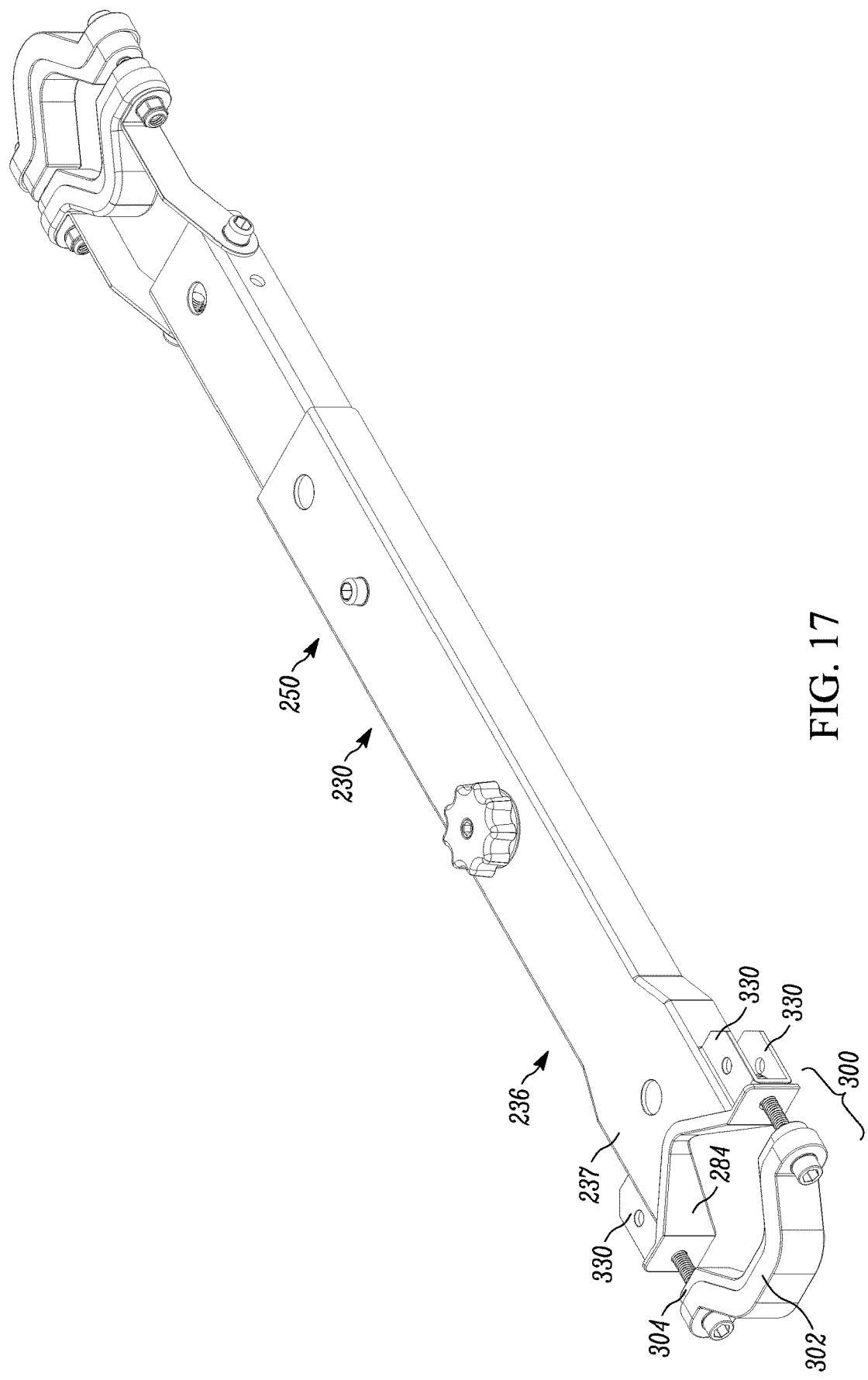
FIG. 17 is a perspective view of an alternative mounting bar.
Figure 18:
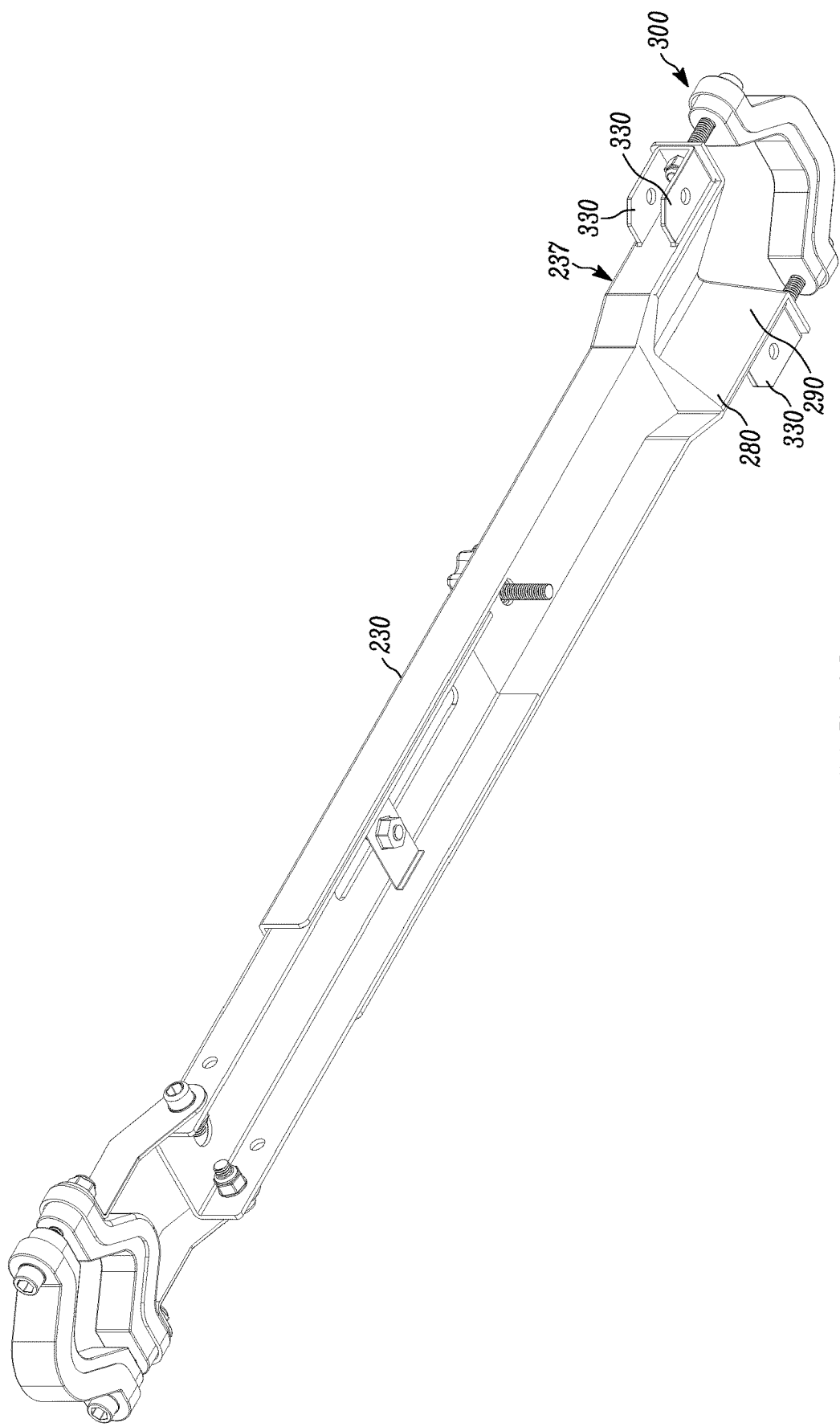
FIG. 18 is a bottom perspective view of the mounting bar of FIG. 17.
Figure 19:
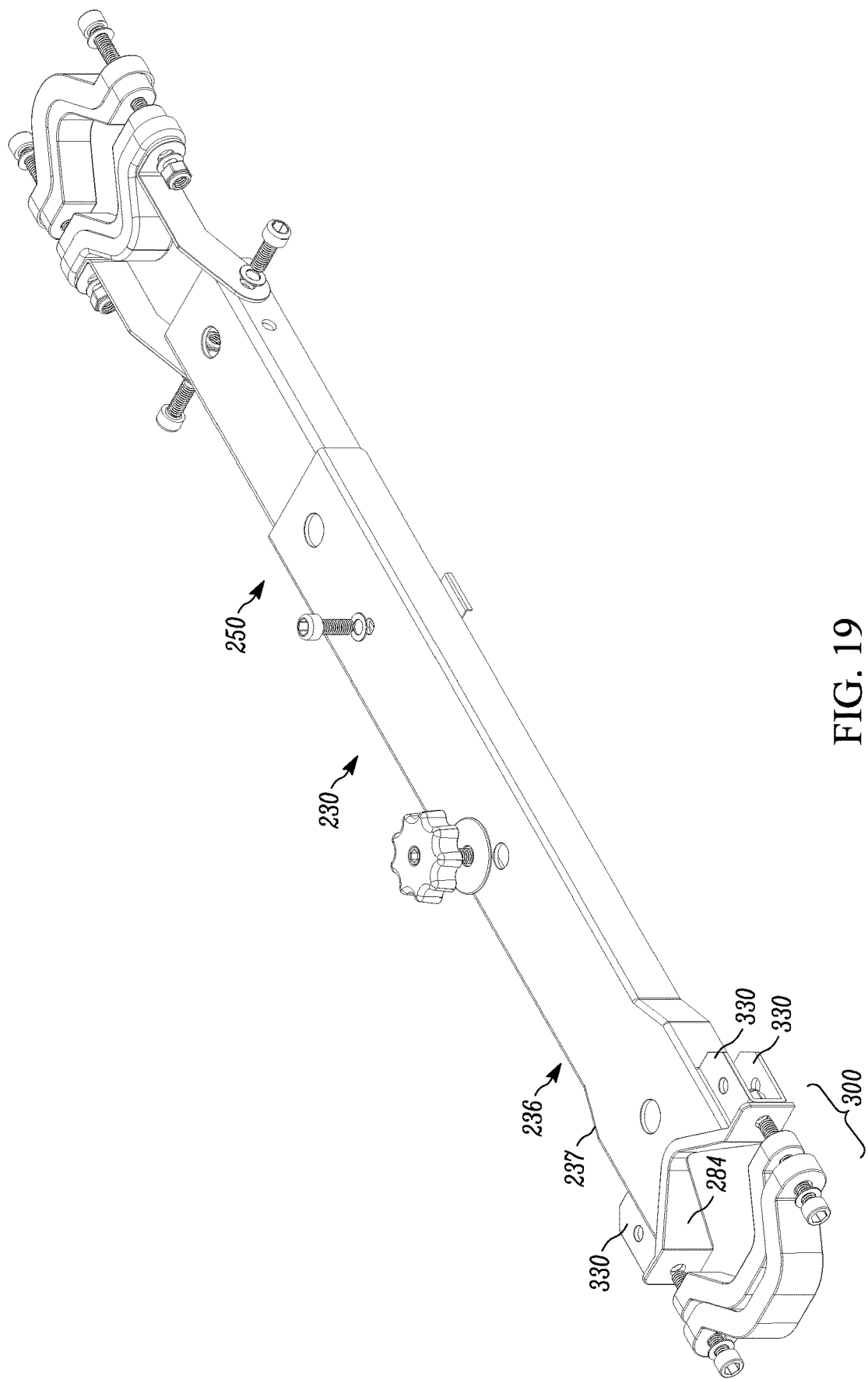
FIG. 19 is a partially exploded view of the mounting bar of FIG. 17.
Figure 20:
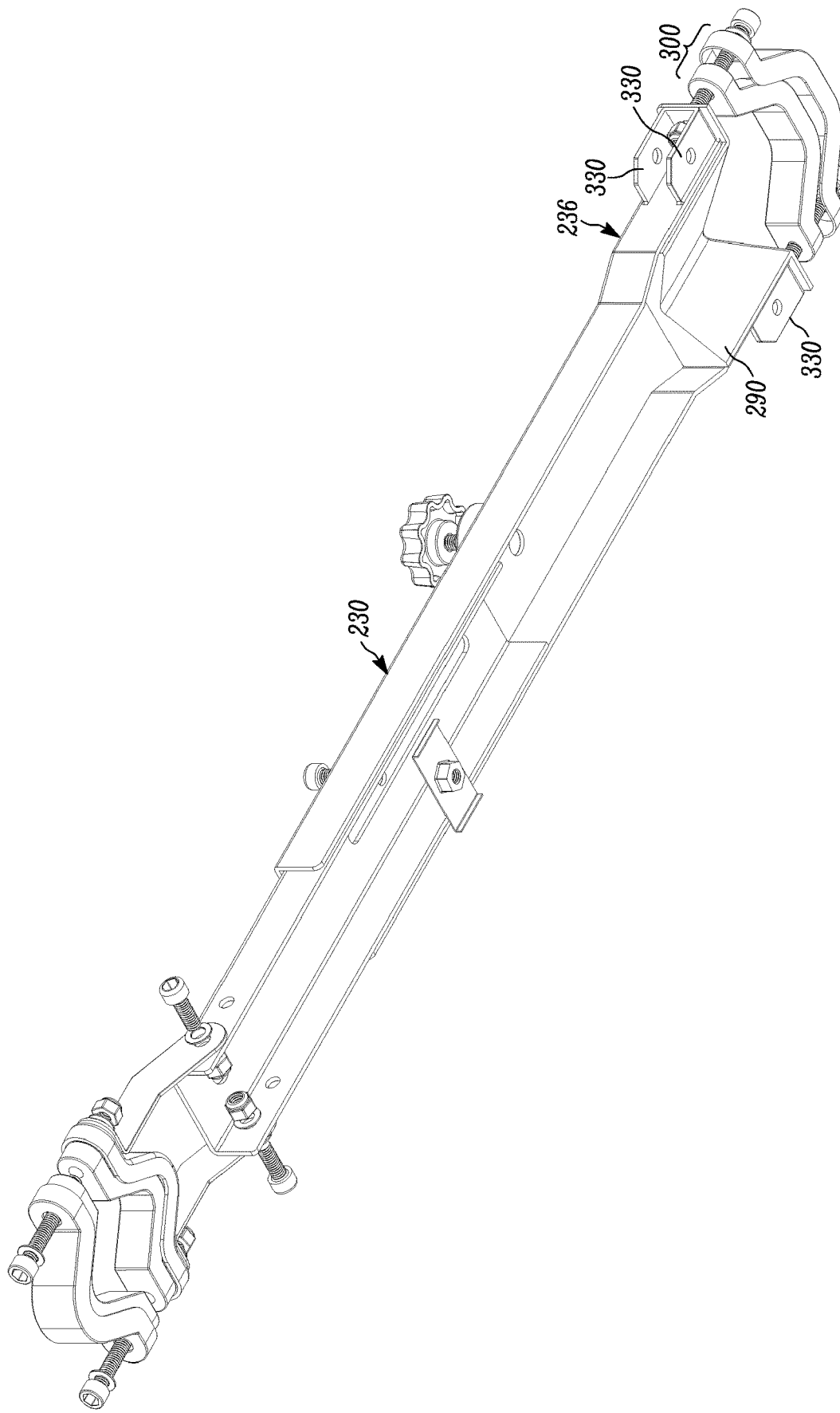
FIG. 20 is a bottom view of the partially exploded form of the mounting bar of FIG. 17.
Figure 21:
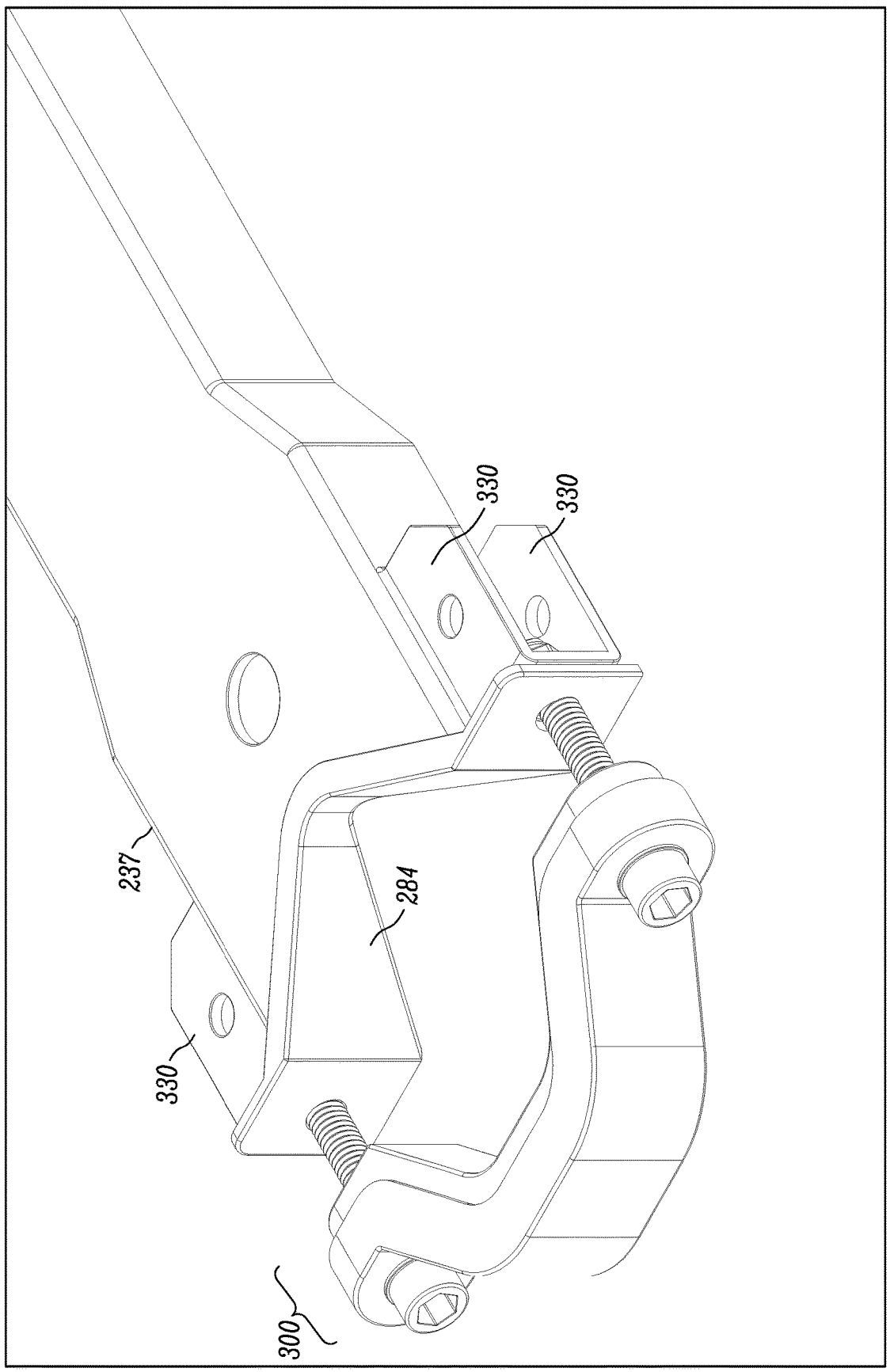
FIG. 21 is a partial view of a first end of the mounting bar of FIG. 17.
Figure 22:
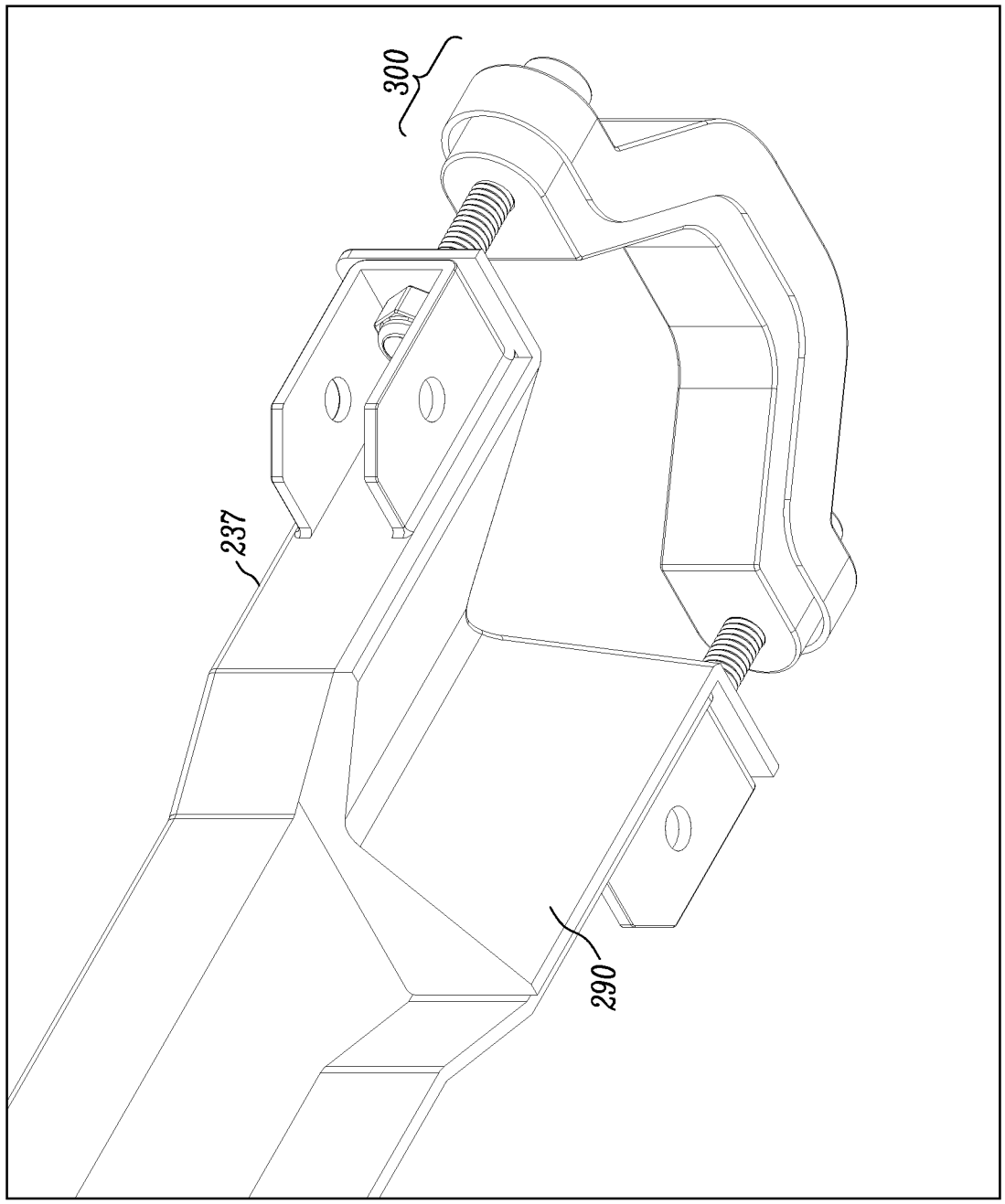
FIG. 22 is a partial view of a bottom portion of the first end of the mounting bar of FIG. 17.
Figure 23:
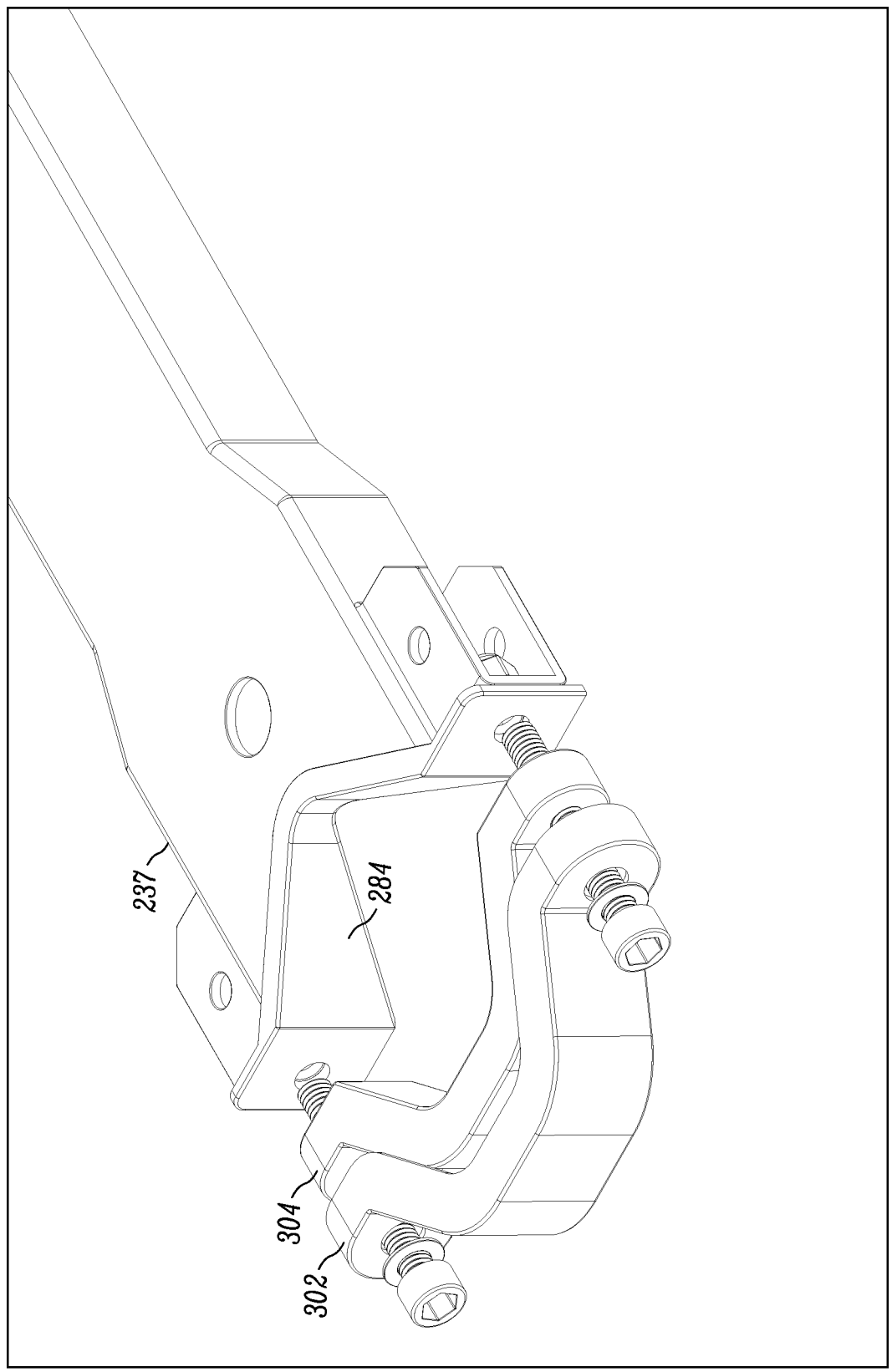
FIG. 23 is a partial view of the first end of the mounting bar of FIG. 17 in an exploded form.
Figure 24:
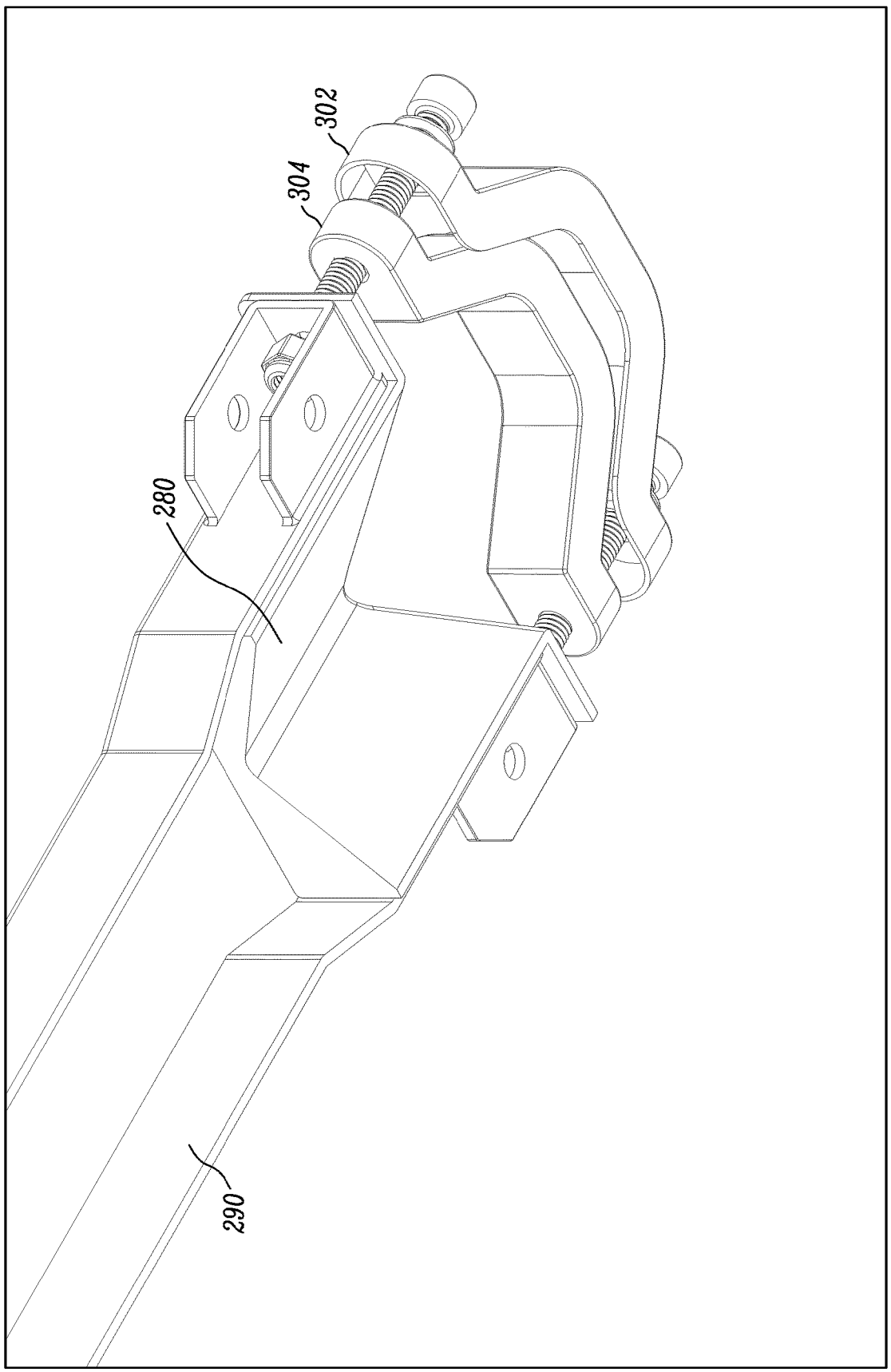
FIG. 24 is a partial bottom view of the first end of the mounting bar of FIG. 17 in an exploded form.

A further embodiment is shown in FIGS. 17-24. In these figures, a mounting bar 230 is shown generally incorporating many of the features discussed previously with respect to mounting bar 30. However, mounting bar 230 is configured so as to work with bicycles having larger tubes, such as larger head tubes, top tubes, and the like. As seen in FIG. 17, a portion of a first end 236 is enlarged to cooperate with larger tubes. In this regard, the enlarged portion 237 has a larger width than the remainder of the body 250.

A mounting bracket 280 is also enlarged. In this regard, a lower surface 290 is enlarged compared to lower surface 90. The lower surface 290 may still be generally arcuate, generally V-shaped, or a combination thereof. Similarly, a front surface 284 may be enlarged. Front surface 284 may still be generally arcuate, generally V-shaped, or a combination thereof.

A different front coupling bracket 300 may be used to accommodate larger structures as well. The front coupling bracket 300 may include an outer bracket 302 and an inner bushing 304. As seen in the figures, front coupling bracket 300 is also a somewhat different shape than front coupling bracket 200, but still is generally arcuate, generally V-shaped, or a combination thereof.

Further, just as with mounting bar 30, mounting bar 230 can be used in similar first and second configurations, coupled to the head tube and/or top tube. However, the mounting bar 230 has integrated structures such that a top bracket 112 is not necessary. Instead, flanges 330 can be used to cooperate with the front coupling bracket 300 to secure the mounting bar 230 to a top tube. In this regard, the front coupling bracket 300 may be positioned underneath the mounting bar 230 and top tube and include one or more fasteners extending between the front coupling bracket 300 and one or more of the flanges 330.

In one form, the brackets 84 and 284 can be installed on existing mounting bars that did not originally come with the bracket. The bracket can therefore be sold as an extra item. The bracket, having a generally arcuate, generally V-shaped, or combination thereof for the front surface along with a generally rectangular bracket, can be used to install the mounting bar to a top tube of a bicycle.

It should be appreciated that the mounting bar and mounting bracket may be configured as a single, integral unit such that the features of the mounting bracket may be incorporated into the mounting bar. Alternatively, they may be separate components, such as shown in many of the figures herein.

Further, the mounting bar and mounting bracket may be constructed from a variety of different materials as desired. In one form, the mounting bar is generally constructed of metal, such as steel, aluminum, and the like. In another form, the top tube is constructed of other materials, such as polymers, carbon fiber, and the like. The mounting bracket may also be constructed from a variety of materials such as metal, plastic, carbon fiber, and the like.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of Applicants' contribution. The actual scope of the protection sought is intended to be defined in the following claims when viewed in their proper perspective based on the prior art.

What is claimed is:

1. A kit for mounting accessories to a bicycle, the kit comprising:
   a mounting bar having a first end and a second end, the first end configured for coupling to a front portion of the bicycle, the second end configured for coupling to a rear portion of the bicycle;
   a front coupling bracket;
   a top coupling bracket; and
   a mounting bracket having a head tube coupling portion and a top tube coupling portion,
   wherein the mounting bracket is positioned adjacent the first end of the mounting bar, the head tube coupling portion is configured to contact a head tube portion of the bicycle in a first configuration and the top tube coupling portion of the mounting bracket is configured to contact a top tube portion of the bicycle in a second configuration and the front coupling bracket couples to the head tube coupling portion of the mounting bracket in the first configuration and the top coupling bracket in the second configuration.

2. The kit of claim 1 wherein the mounting bracket is removably secured within the first end of the mounting bar.

3. The kit of claim 1 wherein the mounting bar comprises at least two body portions wherein a first body portion is configured to be slidably received in a second body portion to adjust a distance between the first and second ends.

4. A mounting bracket for use in mounting accessories to a bicycle, the bracket comprising:
   a front portion;
   a rear portion; and
   a body portion extending longitudinally between the front and rear portions,
   the front portion having a head tube coupling surface that is configured to at least partially contact a head tube of the bicycle when installed in a first configuration, the head tube coupling surface having a portion that is recessed towards the rear portion,
   the body portion having a top tube coupling surface that is configured to at least partially contact a top tube of the bicycle when installed in a second configuration when the head tube coupling surface does not contact the head tube portion of the bicycle, the top tube coupling surface extending between the head tube coupling surface and the rear portion.

5. The mounting bracket of claim 4 wherein the body portion is generally integral with the front portion.

6. The mounting bracket of claim 4 wherein the bracket is made from at least one of polymers, metal, carbon fiber, and combinations thereof.

7. The mounting bracket of claim 4 further comprising at least two flanges extending from the front portion.

8. The mounting bracket of claim 4 wherein the body portion includes a substantially planar top surface extending along a longitudinal plane and substantially planar side portions extending substantially perpendicular to the longitudinal plane.

9. The mounting bracket of claim 8 wherein the head tube coupling surface is inclined at an angle of about 75 to about 85 degrees relative to the top surface.

10. A mounting bar assembly for use in mounting accessories to a bicycle, the mounting bar comprising:
    a first end portion having a head tube coupling surface and a top tube coupling surface;
    a second end portion configured to couple to a rear portion of the bicycle; and
    a body positioned between the first and second end portions,
    wherein the head tube coupling surface includes a portion that is recessed towards the second end portion and is configured to contact a least a portion of a head tube of the bicycle when in a first configuration and the top tube coupling surface extends longitudinally and is configured to at least partially contact a top tube of the bicycle when installed in second configuration.

11. The mounting bar assembly of claim 10 wherein the first end portion includes a mounting bracket removably secured within the first end of the mounting bar.

12. The mounting bar assembly of claim 10 wherein the mounting bar comprises at least two body portions wherein a first body portion is configured to be slidably received in a second body portion to adjust a distance between the first and second ends.

13. The mounting bar assembly of claim 10 wherein at least one of the first and second body portions includes a slot configured to receive a fastener to secure the position of the first and second body portions relative to one another.

14. The mounting bar assembly of claim 10 wherein the mounting bar includes at least one of polymers, metal, carbon fiber, and combinations thereof.

15. The mounting bar assembly of claim 10 further comprising a front coupling bracket and a top coupling bracket, wherein the front coupling bracket is configured to couple to the first end portion of the assembly in the first configuration and the top coupling bracket in the second configuration.

16. The mounting bar assembly of claim 10 further comprising a child seat removably coupled to the body.

* * * * *